Aug. 27, 1935.  A. S. HOWELL  2,012,628
CAMERA SUPPORT
Filed Jan. 18, 1932  4 Sheets-Sheet 4
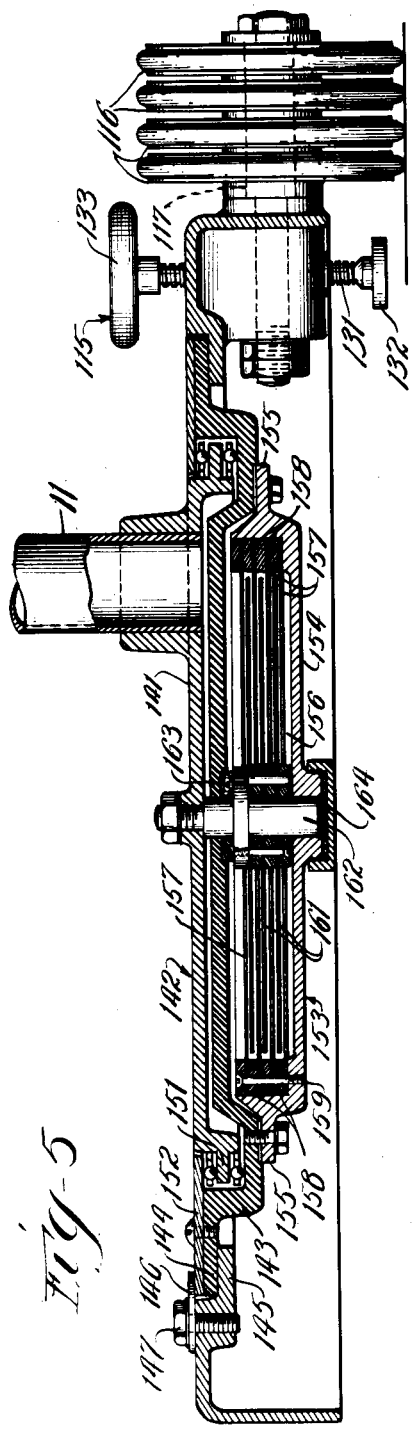
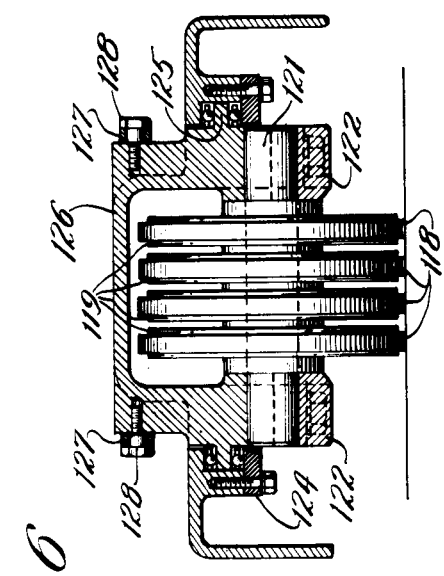
Inventor:
Albert S. Howell.

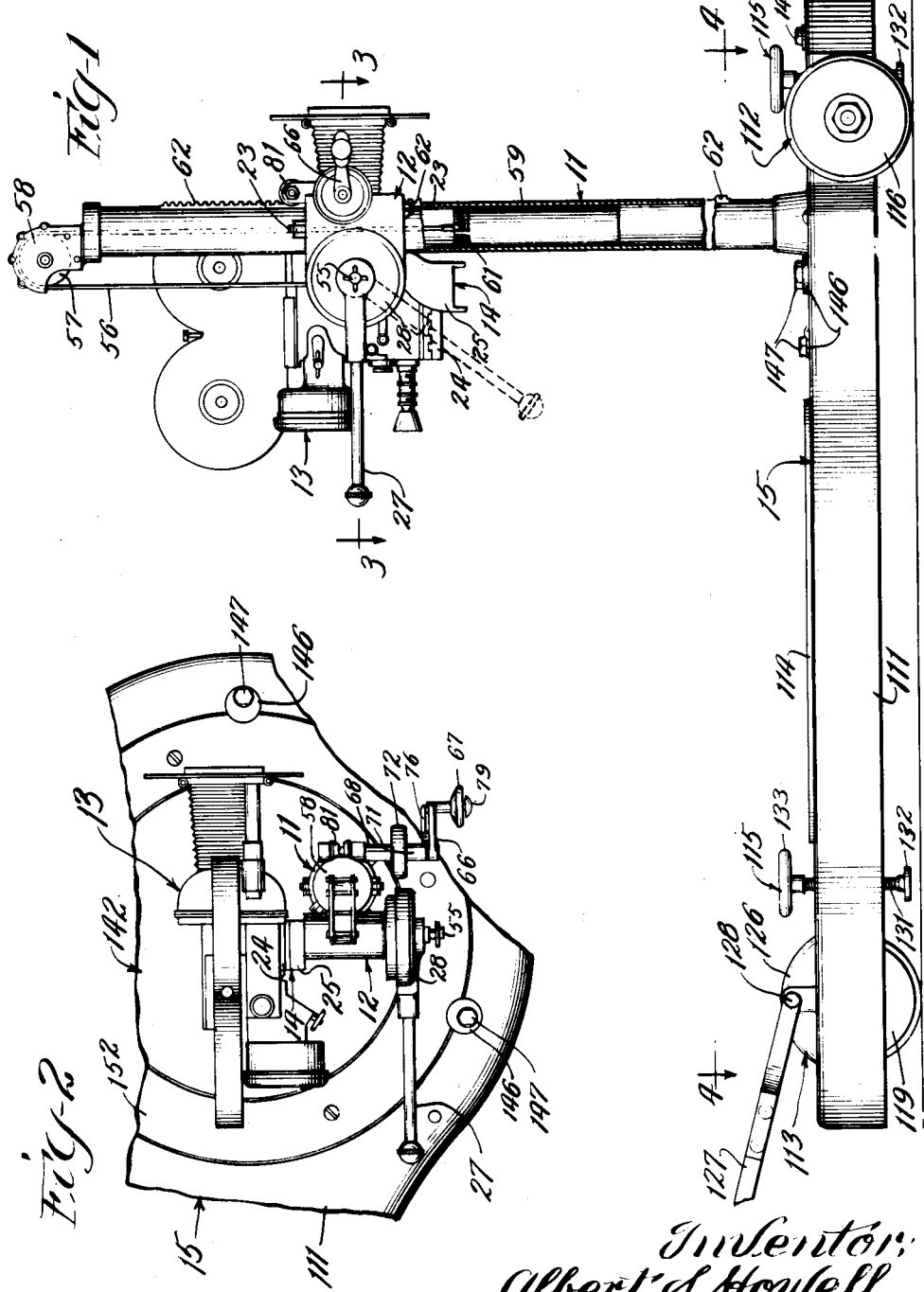

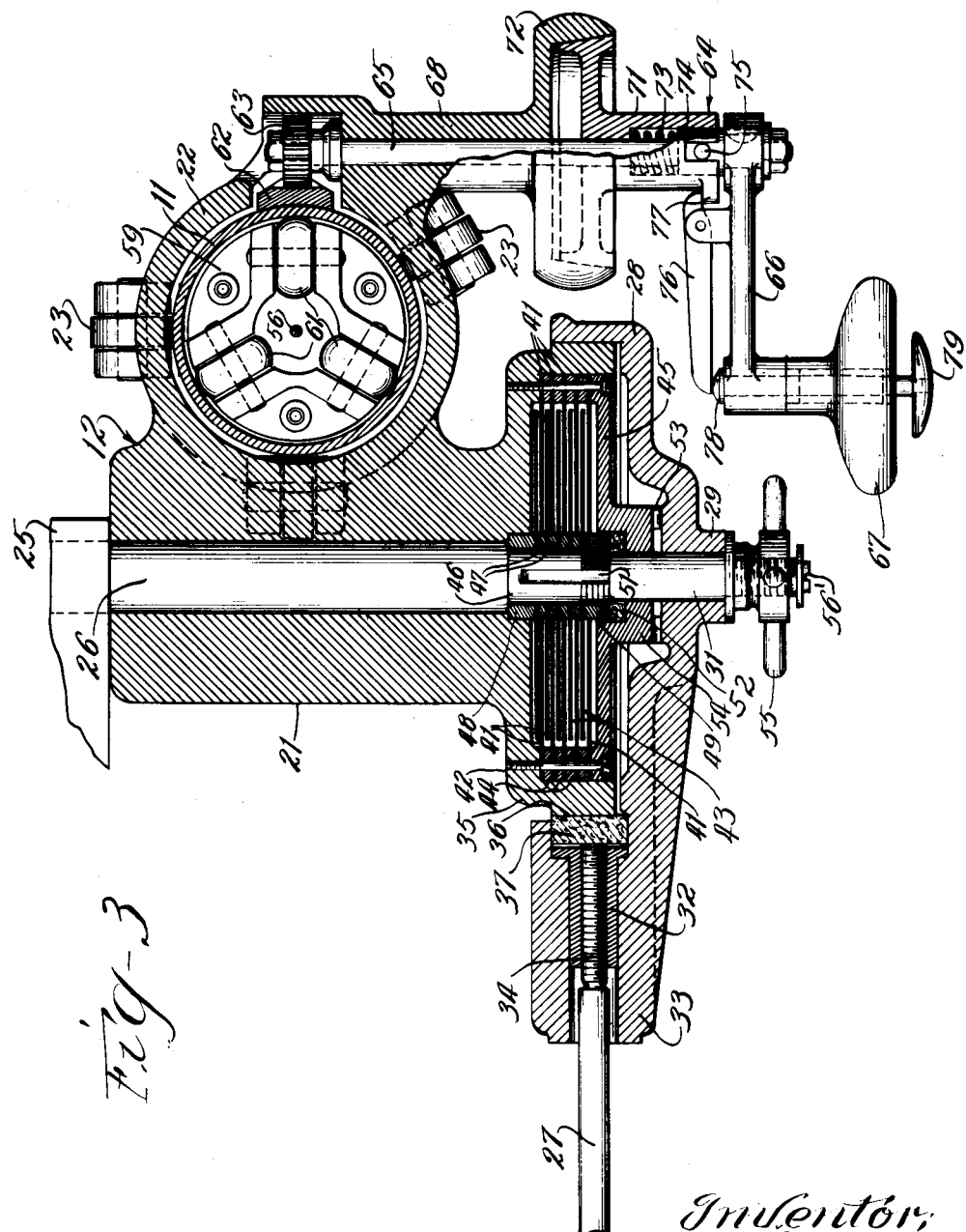

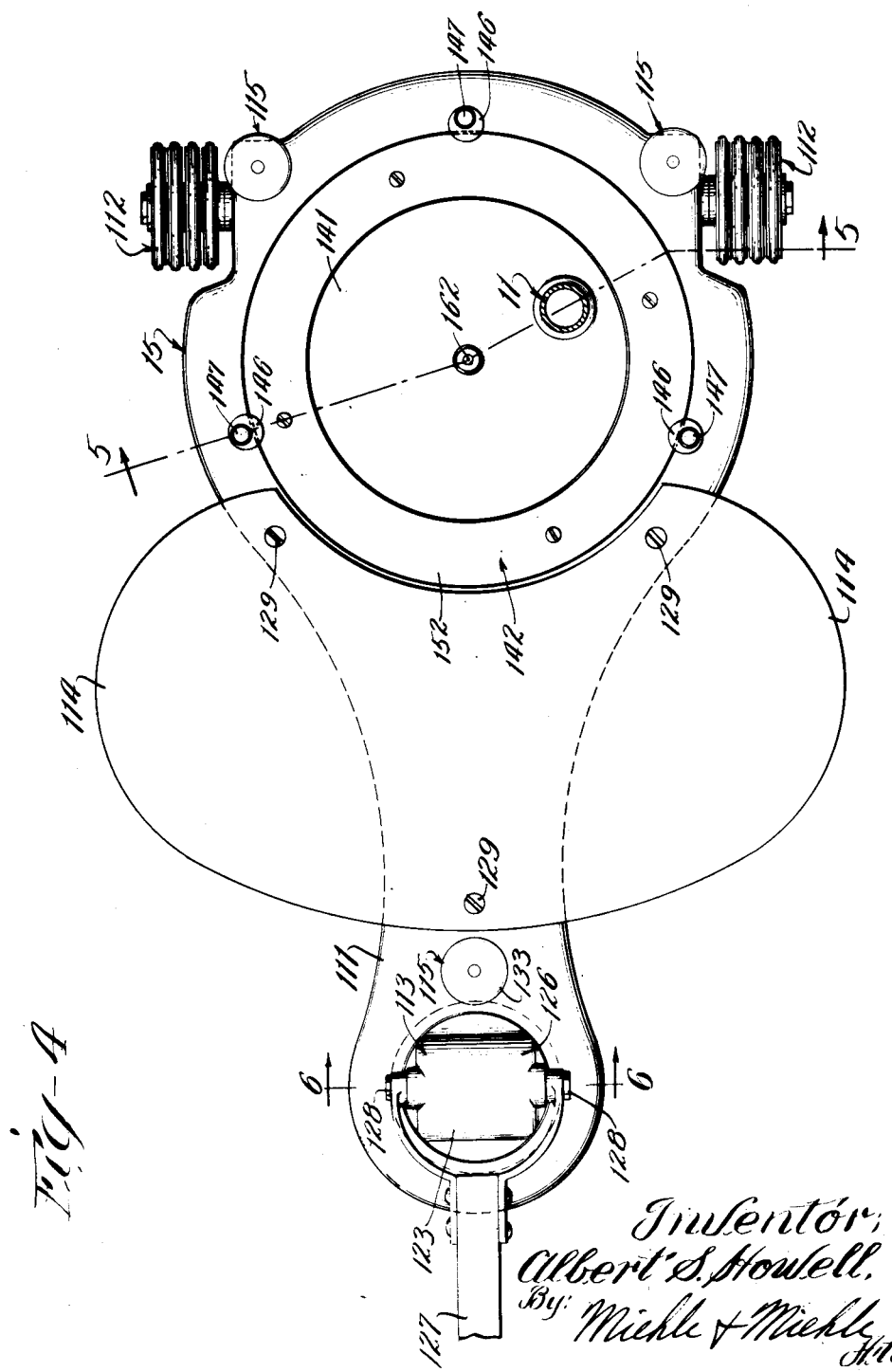

Patented Aug. 27, 1935

2,012,628

UNITED STATES PATENT OFFICE 2,012,628

CAMERA SUPPORT

Albert S. Howell, Chicago, Ill., assignor to The Bell & Howell Company, Chicago, Ill., a corporation of Illinois Application January 18, 1932, Serial No. 587,181

4 Claims. (Cl. 248—162)

This invention relates in general to a camera support and more particularly to a mobile camera carrier.

An important object of the invention is to provide an efficient and mobile camera support with a view toward economy in design and universal adaptability to various conditions of operation.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

Referring to the drawings—

Figure 1 is an elevational view of a device embodying my invention and having a camera assembly attached thereto.

Figure 2 is a fragmentary plan view of the assembly shown in Figure 1.

Figure 3 is a plan section taken substantially on line 3—3 in Figure 1 and illustrating details of construction.

Figure 4 is a similar section taken substantially on line 4—4 in Figure 1 and illustrating one form of base construction; and, Figures 5 and 6 are transverse sections taken substantially on lines 5—5 and 6—6 respectively in Figure 4 further illustrating details of construction of the base.

To illustrate the invention I have shown a standard or column 11, a support member or fixture 12 to which a camera assembly 13 may be attached by means of a carrier 14 and a base or mobile carriage 15.

The column or standard 11 comprises a relatively rigid post preferably of tubular form and rigidly supported in upright position by the base 15 as will be later described.

The support member or fixture 12 may be any suitable fixture arranged for movement along the column 11 or coaxial therewith and having a transverse bored bearing portion 21 or the like disposed on a horizontal axis at one side of the column 11 and in which the carrier 14 may be mounted. In the present embodiment the bearing portion 21 is formed on a sleeve portion 22 embracing the column 11 on which suitable antifriction guide rollers 23 are mounted to engage the column 11 for guiding the support 12.

The carrier 14 may be any suitable device arranged for rotatable engagement in the bearing portion 21 of the support 12 and for attachment to the camera 13 in any suitable manner and in the present embodiment I have shown the carrier 14 formed of a platform 24 (Figures 1, 2 and 3) having a multiple dovetail connection with the camera 13, a bracket 25 suitably connected to the platform 24, and a shaft 26 rigidly secured in the bracket 25 and journaled for pivotal movement in the bearing portion 21, whereby the camera carrier 14 is fixed on this shaft at one side of the support 12.

A preferred form of the carrier 14 provides for supporting the camera 13 with the axis of the shaft 26 substantially in alignment with the center of gravity of the camera assembly as indicated (Figure 1) so that the weight of the camera assembly will be substantially balanced on the shaft 26 to facilitate manipulation of the camera by means of a control device such as a handle 27.

The control handle 27 is connected to the shaft 26, on the other side of the support 12, through a drum shaped cover 28 having a hub portion 29 slidably keyed in a usual manner on an extended portion 31 of the shaft 26 of reduced diameter. A threaded bushing 32 is suitably secured in a sleeve portion 33 of the cover 28 in which a threaded end 34 of the handle 27 is engaged as indicated (Figure 3).

The cover 28 embraces a circular housing portion 35 of the support member 12 surrounding the shaft 26 at said other side of the support member 12 and having a finished peripheral surface 36 and a friction block 37 is arranged between the end 34 of the handle 27 and the surface 36 which may be securely clamped against the surface 36 by rotating movement of the handle 27 to temporarily lock the above mentioned parts and the camera 13 in various positions of adjustment and to provide an adjustable drag resisting tilting movement of the camera.

Drag means is provided to prevent irregular adjusting movement particularly during photographing operations. This is accomplished in the present embodiment by means of a series of annular webs 41 arranged in the housing portion 35 and suitably secured thereto by means of screws 42 or the like and a companion series of webs 43 secured to the shaft 26.

The webs 41 are spaced apart by means of suitable spacers 44 arranged between the webs and a suitable cover 45 incloses the assembly.

The webs 43 are arranged on a reduced portion 46 of the shaft 26 and spaced apart by suitable spacers 47, a collar 48 seated in the housing 35 and engaging a shoulder formed on the shaft 26 provides an end support for the webs 43 and a similar collar 49 which is preferably internally threaded to engage the shaft portion 46 locks the webs 43 in assembled relationship. End thrust of the shaft 26 is taken up by the collar 49.

The webs 41 and 43 are interpositioned or nested and spaced so that there will be no substantial surface contact between the webs and a liquid such as an oil is filled into the housing 35 between the webs 41 and 43 to effect the drag connection. The drag may be varied by the use of liquids of different viscosity until a desirable action is obtained. Relatively light lubricating oils have proven satisfactory.

The number of webs 41 and 43 is proportional to the area thereof and they are preferably relatively flexible.

Suitable lugs may be formed on the webs 43 to engage in a way 51 for locating the webs and a fibrous packing ring 52 may be provided for preventing the escape of the liquid in the housing 35.

A separate locking mechanism is provided for fixedly locking the camera 13 in an adjusted position such as for panoramic photography and to accomplish this substantially V shaped teeth 53 are formed on a hub portion 54 of the cover 45 and to engage companion teeth similarly formed on the cover 28 when said cover 28 is in the position shown (Figure 3), positively locking the shaft 26 against rotation in the support member 12.

A hand wheel 55 having threaded engagement with the end 31 of the shaft 26 secures the parts in locked relationship and when released or retracted permits disengagement of the teeth 53 by permitting axial movement of the cover 28. A screw 56' and suitable washer prevent inadvertent removal of the hand wheel 55.

The camera 13, through the carrier 14 and support fixture 12, is supported on the column by means of a strand 56 taking over a pulley 57 suitably mounted in a cap 58 secured to the column and to provide means for balancing the weight of the camera 13 and the associated parts a suitable counterweight 59 preferably arranged within the column and guided thereby is secured to the opposite end of the strand 56.

Suitable antifriction rollers 61 may be mounted on the counterweight 59 to reduce friction.

To provide means for adjusting the elevation of the camera 13 means is provided for moving the assembly along the column 11 and to accomplish this a toothed rack 62 is suitably secured to the column 11 for engagement by a gear 63 and a crank mechanism 64 is provided for actuating the gear 63.

The crank mechanism 64 includes a shaft 65 to which the gear 63 is rigidly secured, a crank arm 66 secured to the opposite end of the shaft 65, and a knob 67 carried by the crank arm 66. The shaft 65 is rotatably mounted in a bearing portion 68 formed on the support 12 and means is provided for locking the camera and associated parts in operative positions.

To accomplish this a clutch member 71 is arranged on the shaft 65 and to engage a companion clutch member 72 associated with the bearing portion 68. A spring 73 positioned in the clutch member 71 and engaging a shoulder 74 formed on the shaft 65 normally urges the clutch members together to prevent operation of the shaft 65 through a connection formed by a pin 75 engaging in a slot formed in the clutch member 71.

To provide means for releasing the shaft 65 to permit adjustment of the camera a clutch release is provided including a release lever 76 pivotally supported on the crank 66 and engaging a lug 77 formed on the clutch member 71, and a release pin 78 mounted in the crank 66 and knob 67 to engage the lever 76 and provided with a cap 79 facilitating operation.

The clutch member 71 is released by grasping the knob 67 and pressing the cap 79 against the knob and is engaged by the spring 73 when the cap 79 is released.

A guide roller 81 suitably secured to the support 12 as indicated (Figure 1) and engaging the rack 62 maintains alinement of the camera assembly with respect to the column 11.

The base or mobile carriage 15 includes a body 111 (Figures 1, 4, 5 and 6) supported on remotely located roller assemblies 112 and 113, a removable platform plate 114, and rigid supports or screws 115.

The body 111 may be of any suitable material and formed substantially as shown.

The roller assemblies 112 each include one or more wheels 116 mounted for free rotation on a suitable shaft 117 which is suitably mounted in the base 111 as indicated (Figure 5). The wheels 116 are preferably tired and of narrow tread and provided in series or numbers such as four as shown to facilitate the use of soft tires without permitting extreme yielding or swaying of the apparatus when in motion.

The roller assembly 113 is similar to the assemblies 112 except that treads 118 of wheels 119 thereof are flat surfaced to increase the bearing surface of the assembly. The wheels 119 are rotatably mounted on a shaft 121 which is suitably secured by means of bearing caps 122 or the like in a head 123 which is rotatably mounted to facilitate guiding the apparatus.

The head 123 is arranged in an opening formed in the base and secured thereto by means of a clamp ring 124 engaging an annular flange portion 125 thereof. Suitable bearing balls may be provided as shown (Figure 6) to reduce friction.

A hood portion 126 of the head 123 covers or conceals the wheels 119 and a handle 127 may be provided having a yoke connection with the head 123 and attached thereto by means of shoulder screws 128.

The platform plate 114 may be a sheet metal plate of suitable size attached to the base 15 by means of screws 129 or the like and of suitable strength to support an operator during manipulation of the camera particularly in the higher positions.

The rigid supports 115 may be any suitable device whereby the apparatus may be supported independent of the wheels while the camera is in operation such as a jack screw 131 having a pressure foot 132 and hand wheel 133 suitably secured thereto and having threaded engagement with the base 15 or the like.

It is an object of this invention to support the camera 13 so that it may be rotated about an axis extending through or adjacent its center of gravity to prevent unnecessary changes in focal length during operation and to accomplish this the vertical column 11 is mounted on the base 15 for bodily rotation about a vertical axis outside or remote from the axis of the column and preferably to an extent equal or corresponding to the extent of the offset of the column from the camera, the camera being disposed substantially at the aforesaid vertical axis of rotation, thus accomplishing the aforesaid purpose and in addition substantially centering the weight of the camera at this axis. The shaft 26 is horizontally disposed and is preferably arranged in parallelism with the common axial plane of the aforesaid vertical axis of rotation and the column 11, so that the tilting movement of the camera is effected on a horizontal axis extending correspondingly or, as shown, in parallelism with the aforesaid common axial plane, the tilting movement of the camera being thus conveniently arranged with reference to the horizontal movement thereof, and the view of the operator along the focal axis of the camera being unobstructed.

In the present embodiment the column 11 is rigidly secured to a rotatable part 141 of a removable connecting or carrier mechanism 142 which includes a stationary part 143 having an annular flange 144 arranged for support on a similar flange 145 formed on the base 15.

The carrier mechanism 142 is secured to the base 15 by suitable plates 146 secured to the base 15 by means of screws 147 and extending over the flange 144.

The rotatable part 141 is supported through an annular flange 151 mounted between bearing balls which are slightly preloaded by means of a slightly flexible annular cover plate 152 as indicated (Figure 5).

A drag mechanism 153 similar to that associated with the shaft 26 is provided to control movement or changes of position of the column 11.

The drag mechanism 153 includes a carrier 154 having a suitable flange 155 facilitating operative connection of the mechanism to the stationary part 143 and forming a well 156 in which a viscous liquid may be contained, a series of stationary webs 157 suitably separated by spacers 158 mounted in the well 156 and rigidly secured by means of screws 159, and a companion series of webs 161 mounted on and rigidly secured as indicated (Figure 5) to a pivot post 162 having bearings in the carrier 154 and the stationary part 143 and rigidly secured to the rotatable part 141 for rotation therewith.

The webs 161 and 157 are similar to the webs 41 and 43 above described and similarly proportioned and spaced and are or may be submerged in an oil or other liquid having suitable viscosity.

A packing ring 163 and closure cap 164 may be provided to prevent the escape of the liquid Obviously the apparatus may be moved about on the wheels 116 and 119 from one position to another and when in position the jack screws 115 may be turned down to rigidly support the apparatus.

The camera 13 is moved to any desired elevation along the column 11 by means of the crank 66 as above described and further manipulation of the camera is effected by means of the manipulating handle 27 as above described.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a photographic camera support the combination with a base, of a vertical column mounted thereon for angular movement on a vertical axis spaced from that of said column, a support mounted on said column for adjustment therealong and angularly fixed therewith, and a camera carrier mounted on said support for pivotal movement on a horizontal axis extending correspondingly with the common axial plane of said column and said vertical axis and adapted to carry a camera on the side of said column on which said vertical axis is disposed.

2. In a photographic camera support the combination with a wheeled base, of a vertical column mounted thereon for angular movement on a vertical axis spaced from that of said column, a support mounted on said column for adjustment therealong and angularly fixed therewith, a camera carrier mounted on said support for pivotal movement on a horizontal axis and adapted to carry a camera on the side of said column on which said vertical axis is disposed, an operator's platform on said base, and an extension handle fixed with said camera carrier for adjustment of the camera by an operator on said platform.

3. In a photographic camera support the combination with a wheeled base, of a vertical column mounted thereon for angular movement on a vertical axis spaced from that of said column, a support mounted on said column for adjustment therealong and angularly fixed therewith, a camera carrier mounted on said support for pivotal movement on a horizontal axis extending correspondingly with the common axial plane of said column and said vertical axis and adapted to carry a camera on the side of said column on which said vertical axis is disposed, an operator's platform on said base, and an extension handle fixed with said camera carrier for adjustment of the camera by an operator on said platform.

4. In a photographic camera support the combination with a column, of a support mounted on the column for adjustment therealong, a shaft journaled for pivotal movement in a bore through said support and disposed at one side of said column on an axis transverse thereto, a camera carrier fixed on said shaft on one side of said support, liquid friction drag means operative between said support and camera carrier and including a circular housing on said support, a radial extension handle structure for angularly adjusting said camera carrier, and releasable friction means associated with said handle structure and controlled therefrom and adapted to engage said housing for securing said camera carrier in adjusted position.

ALBERT S. HOWELL.